US008154737B2

(12) United States Patent
Ferlitsch

(10) Patent No.: US 8,154,737 B2
(45) Date of Patent: Apr. 10, 2012

(54) METHOD AND SYSTEM FOR ESTIMATING COLOR INK USAGE FOR A PRINT JOB ELEMENT

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1306 days.

(21) Appl. No.: 11/827,234

(22) Filed: Jul. 11, 2007

(65) Prior Publication Data

US 2009/0016748 A1 Jan. 15, 2009

(51) Int. Cl.

| | |
|---|---|
| ***G06F 3/12*** | (2006.01) |
| *G06K 15/00* | (2006.01) |
| *G03G 15/08* | (2006.01) |
| *G03G 15/01* | (2006.01) |
| *G03G 21/02* | (2006.01) |

(52) U.S. Cl. ..................... 358/1.13; 358/1.14; 358/1.15; 358/1.16; 358/1.17; 358/1.18; 399/79; 399/27; 399/39; 347/7; 347/19

(58) Field of Classification Search ........ 358/1.11–1.18, 358/504; 399/79, 27; 347/7, 19
See application file for complete search history.

(56) References Cited

U.S. PATENT DOCUMENTS

| | | | | |
|---|---|---|---|---|
| 5,937,225 | A | 8/1999 | Samuels | 399/27 |
| 6,297,829 | B1 * | 10/2001 | Sekine et al. | 345/467 |
| 6,356,359 | B1 | 3/2002 | Motamed | 358/1.8 |
| 6,580,879 | B2 | 6/2003 | Coleman et al. | 399/27 |
| 6,761,427 | B1 * | 7/2004 | Owen et al. | 347/19 |
| 6,773,176 | B2 * | 8/2004 | Kurosawa | 400/76 |
| 6,991,319 | B2 | 1/2006 | Zerza et al. | 347/43 |
| 7,029,088 | B2 | 4/2006 | Fernandez | 347/19 |
| 7,145,669 | B2 * | 12/2006 | Jacobsen | 358/1.13 |
| 2002/0076245 | A1 * | 6/2002 | Aiyama | 400/61 |
| 2002/0078275 | A1 | 6/2002 | Yamaguchi | 710/72 |
| 2002/0131070 | A1 | 9/2002 | Housel et al. | 358/1.15 |
| 2002/0191039 | A1 | 12/2002 | Minowa et al. | 347/7 |
| 2003/0214542 | A1 * | 11/2003 | Yoshida et al. | 347/7 |
| 2004/0207668 | A1 * | 10/2004 | Adkins et al. | 347/7 |
| 2005/0083541 | A1 | 4/2005 | Clark et al. | 358/1.9 |
| 2005/0244172 | A1 * | 11/2005 | Kreckel | 399/27 |
| 2006/0077427 | A1 | 4/2006 | Zhang et al. | 358/1.15 |
| 2006/0078345 | A1 | 4/2006 | Lovat et al. | 399/79 |
| 2006/0078346 | A1 | 4/2006 | Lovat et al. | 399/79 |
| 2006/0203272 | A1 | 9/2006 | Manalo et al. | 358/1.13 |
| 2006/0203277 | A1 | 9/2006 | Suzuki | 358/1.14 |

(Continued)

FOREIGN PATENT DOCUMENTS

| | | |
|---|---|---|
| JP | 11184336 | 7/1999 |

(Continued)

*Primary Examiner* — Mark K Zimmerman
*Assistant Examiner* — Satwant Singh
(74) *Attorney, Agent, or Firm* — Scot A. Reader

(57) ABSTRACT

Methods and systems for estimating the amount of color ink that will be used to print a print job element classify individual color drawing objects of the print job element in a pre-raster image process (pre-RIP) format into drawing object classes and apply predetermined rules associated with the drawing object classes to obtain color ink usage estimates for the individual color drawing objects. Combination of color ink usage estimates for the individual color drawing objects yields a prompt and meaningful estimate of color ink usage for the print job element. The estimate of color ink usage for the print job element can be put to advantageous use in a pay-for-print service.

19 Claims, 6 Drawing Sheets

U.S. PATENT DOCUMENTS

| | | | | |
|---|---|---|---|---|
| 2006/0233559 | A1 | 10/2006 | Sugita et al. | 399/27 |
| 2007/0003306 | A1 * | 1/2007 | Jacobsen et al. | 399/79 |
| 2007/0070454 | A1 * | 3/2007 | Ernst et al. | 358/504 |
| 2009/0089192 | A1 * | 4/2009 | Ferlitsch | 705/33 |

FOREIGN PATENT DOCUMENTS

| | | | |
|---|---|---|---|
| JP | 2001-293855 | A1 | 10/2001 |
| JP | 2002149379 | | 5/2002 |

* cited by examiner

METHOD AND SYSTEM FOR ESTIMATING COLOR INK USAGE FOR A PRINT JOB ELEMENT

BACKGROUND OF THE INVENTION

The present invention relates to fee-based printing and, more particularly, to estimating the amount of color ink that will be consumed printing a print job element in support of a pay-for-print service with differential pricing.

Differential pricing in pay-for-print services has conventionally been limited to a binary pricing model that charges a customer a base rate for a black-and-white page and a premium rate for a color page. However, the true cost of printing correlates with the types and amounts of the respective inks used to print the page. Since the binary pricing model fails to take into account the amounts of the respective inks used, it inevitably results in some customers being overcharged and other customers being undercharged. For example, under the binary pricing model, a first customer who wants a color logo printed on the corner of an otherwise black-and-white page pays the rate same rate as a second customer who wants a color photograph to span the page, even though the true cost to print the first customer's page is much lower than the true cost to print the second customer's page. Under the binary pricing model, the first customer therefore subsidizes the second customer.

A considerable obstacle to differential pricing models that more accurately reflect the true cost of print jobs has been difficulty in estimating the amount of color ink used. One known approach to estimating color ink usage is to fully rasterize an image into an engine-ready bitmap and then examine each pixel in the bitmap to determine how much color ink a printed page having the image will require. This approach is highly accurate; however, since this approach requires the image to be fully rasterized before conducting the review and inspects every pixel it can be unduly time consuming. Another known approach to estimating color ink usage is to construct a reduced resolution bitmap of an image (e.g. thumbnail), examine each pixel of the reduced resolution bitmap and interpolate how much color ink a printed page having the image will require. This approach is less accurate and still requires partial rasterization of the image, which can lead to substantial delays in providing the estimate.

SUMMARY OF THE INVENTION

The present invention, in a basic feature, provides methods and systems for estimating the amount of color ink that will be used to print a print job element in which individual color drawing objects of a print job element in a pre-raster image process (pre-RIP) format are assigned to drawing object classes associated with predetermined rules that are applied to obtain color ink usage estimates for the individual color drawing objects. The color ink usage estimates for the individual color drawing objects are then combined to yield a prompt and meaningful estimate of color ink usage for the print job element. The estimate of color ink usage for the print job element can be put to advantageous use in a pay-for-print service; for example, can be used as a basis for charging customers in a manner that better reflects the true costs of printing, can be used to provide on-the-spot price quotations to customers before starting print jobs and can be used to confirm sufficient funds in customer accounts before allowing customers to start print jobs.

In one aspect of the invention, a computer node comprises a network interface, a memory and a processor communicatively coupled with the network interface and the memory, wherein a print job element in a pre-RIP format is received on the network interface and stored in the memory and wherein the processor has instructions executable thereon to, for each of a plurality of color drawing objects within the print job element, assign the object to a drawing object class selected from a plurality of predetermined drawing object classes and apply to the object a predetermined set of rules associated with the class to which the object is assigned to obtain at least one color ink usage estimate for the object.

In some embodiments, the processor has instructions executable thereon to combine the color ink usage estimates obtained for the plurality of color drawing objects to obtain a color ink usage estimate for the print job element.

In some embodiments, the processor has instructions executable thereon to determine a charge based at least in part on the color ink usage estimate for the print job element.

In some embodiments, the computing node transmits information indicative of the charge to a client node for authorization.

In some embodiments, the computing node transmits information indicative of the charge to an accounting node for verification of sufficient funds.

In some embodiments, the computing node transmits information indicative of the charge to an accounting node for debiting an account.

In some embodiments, the processor has instructions executable thereon to distinguish the color drawing objects from black and white drawing objects.

In some embodiments, the computing node is a print management node communicatively coupled via a communication network with a client node and a printing node.

In some embodiments, the print job element is a logical page, an impression or a sheet.

In some embodiments, the pre-RIP format is a client application format, a page description language (PDL) format, a vector language format or a device independent bitmap format.

In some embodiments, the at least one color ink usage estimate for the object comprises an individual ink usage estimate for a primary color.

In some embodiments, the predetermined rules are operative to estimate color intensity and a print area for the object.

In some embodiments, the object is assigned to a text object class and the predetermined rules are operative to estimate a print area for each of a plurality of characters in the object based at least in part on character type.

In some embodiments, the object is assigned to a vector object class and the predetermined rules are operative to estimate a print area for the object based at least in part on a length and width of a path traversed by the object and/or an area filled by the object.

In some embodiments, the object is assigned to a bitmap object class and the predetermined rules are operative to estimate a print area for the object based on color components of pixels in sampled areas of the object and interpolation.

In another aspect of the invention, a method for estimating color ink usage for a print job element comprises receiving the print job element in a pre-RIP format and, for each of a plurality of color drawing objects within the print job element, assigning the object to a drawing object class selected from a plurality of predetermined drawing object classes and applying to the object a predetermined set of rules associated with the class to which the object is assigned to obtain at least one color ink usage estimate for the object.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
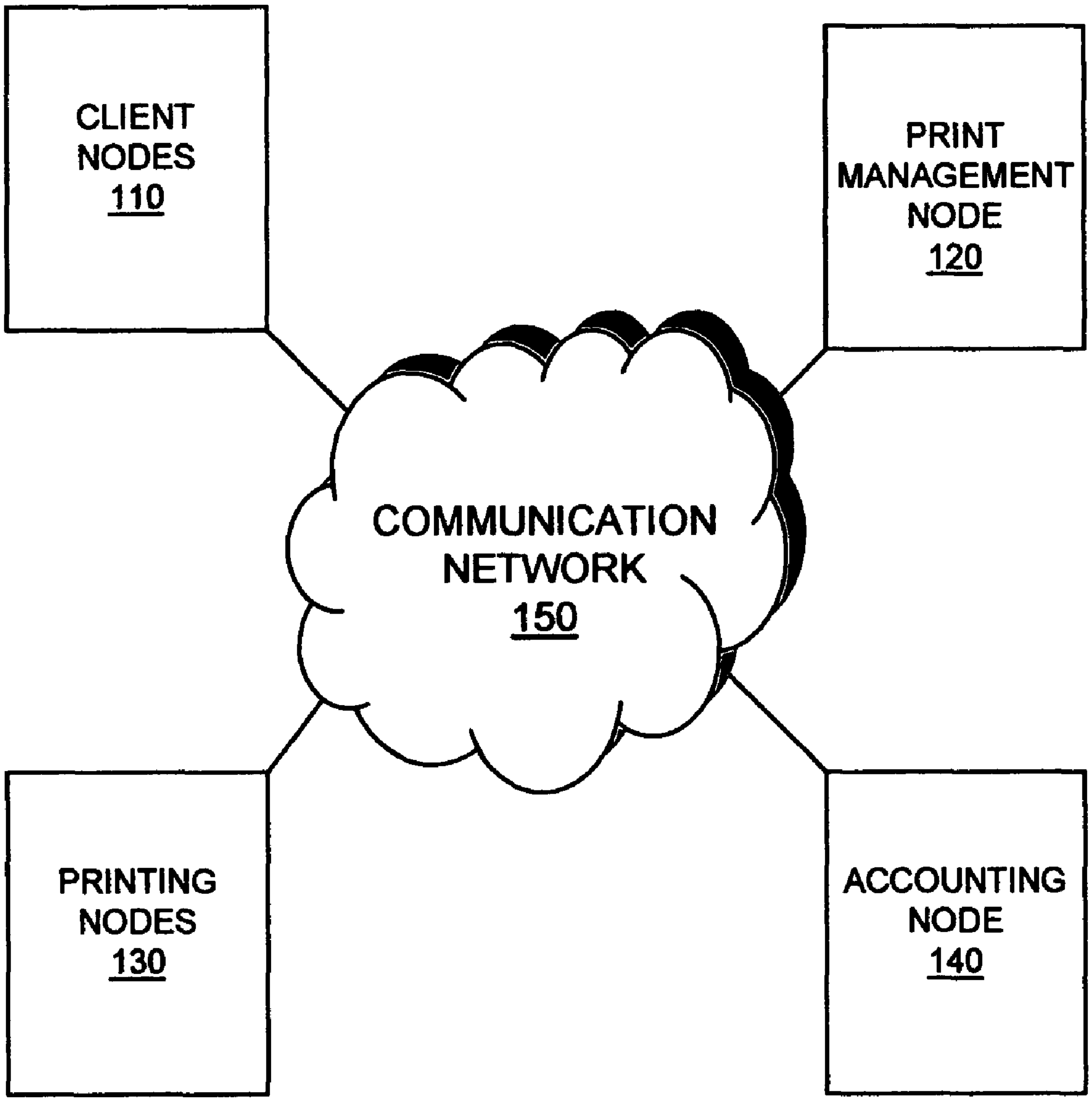
FIG. 1 shows a fee-based printing system in which the present invention is operative in some embodiments.

In FIG. 1, a fee-based printing system in which the present invention is operative in some embodiments is shown. The system includes client nodes 110, a print management node 120, printing nodes 130 and an accounting node 140, all of which are communicatively coupled via a communication network 150.

Client nodes 110 are data communication devices, such as a personal computers, workstations, cellular phones or personal data assistants (PDA), each having a user interface for specifying and initiating print jobs and generating and transmitting to print management node 120 via a network interface, such as an Ethernet interface or a universal serial bus (USB) interface, print requests for print jobs.

Print management node 120 is a data communication device having a network interface that receives from client nodes 110 print requests for print jobs and assigns and schedules to printing nodes 130 print jobs for printing in a hard copy format. In some embodiments, print management node 120 also estimates the amount of color ink that will be used by each element of a print job through classification and analysis of individual color drawing objects of the print job element in a pre-RIP format and determines a print charge for the print job element based at least in part on the color ink usage estimate. The print charge for the print job element may be summed with the print charges of other print job elements to determine a print charge for the print job, which may be transmitted in an authorization request to the one of client nodes 110 that initiated the print request to seek explicit authorization from a user of the client node to proceed with the print job, or transmitted in a verification request to accounting node 140 to verify sufficient funds in the user's account to pay for the print job prior to printing with the print job, or transmitted in a charge request to accounting node 140 to debit the user's account, for example. In other embodiments, color ink usage estimates and print charge determinations may be generated on a data communication device other than a print management node, such as on a printing node that prints a print job. Print management node 120 may fall within a class of devices commonly referred to as print server nodes, network print queue nodes or Internet print provider nodes, for example.

Printing nodes 130 are printing devices each having a network interface, such as an Ethernet interface or USB interface, and adopted to generate as output hard copies of print jobs that are assigned and scheduled to printing nodes 130 by print management node 120. Printing nodes 130 receive print jobs in the form of PDL-formatted print data, rasterize the PDL-formatted print data into engine-ready print data and output hard copies of print jobs. In other embodiments, print data may arrive on printing nodes in a vector language format, such as an SVG or HP-GL/2 format, a device independent bitmap format, such as a TIFF, JPEG, PNG, GIF, BMP or EXIF format or a document's original format, such as an MS Word format. Printing nodes 130 support color printing, which may involve heat or chemical fusing of dry color inks (e.g. toners) to sheets of paper or spraying of liquid color inks on sheets of paper, for example. In some embodiments, printing nodes 130 print using cyan, yellow, magenta and black (CYMK) inks.

Accounting node 140 is a data communication device having a network interface and that manages user accounts. Account management services supported by accounting node 140 may include verifying sufficient funds in a user account in response to a verification request received from print management node 120 that includes a print charge, or debiting a user account in response to a charge request received from print management node 120, for example.

Communication network 150 is a data communication network that includes one or more LANs, WANs or other data communication networks each having one or more multiplexing nodes, such as routers, switches, bridges or hubs, that operate to communicatively couple nodes 110, 120, 130 and 140.

Figure 2:
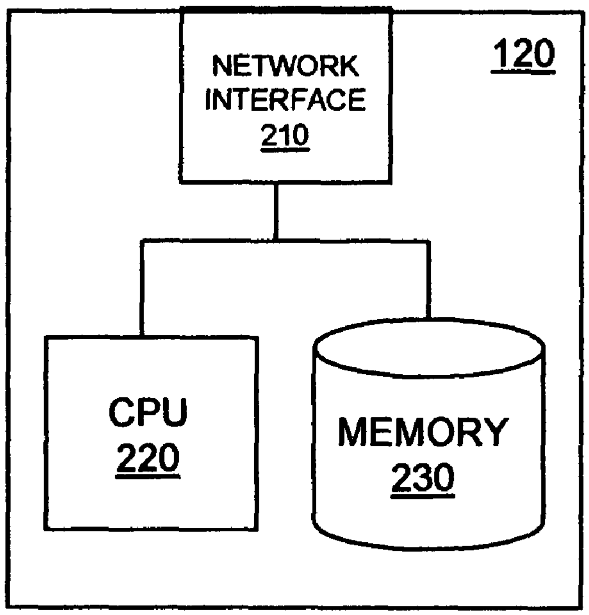
FIG. 2 shows the print management node of FIG. 1 in more detail.
Figure 3:
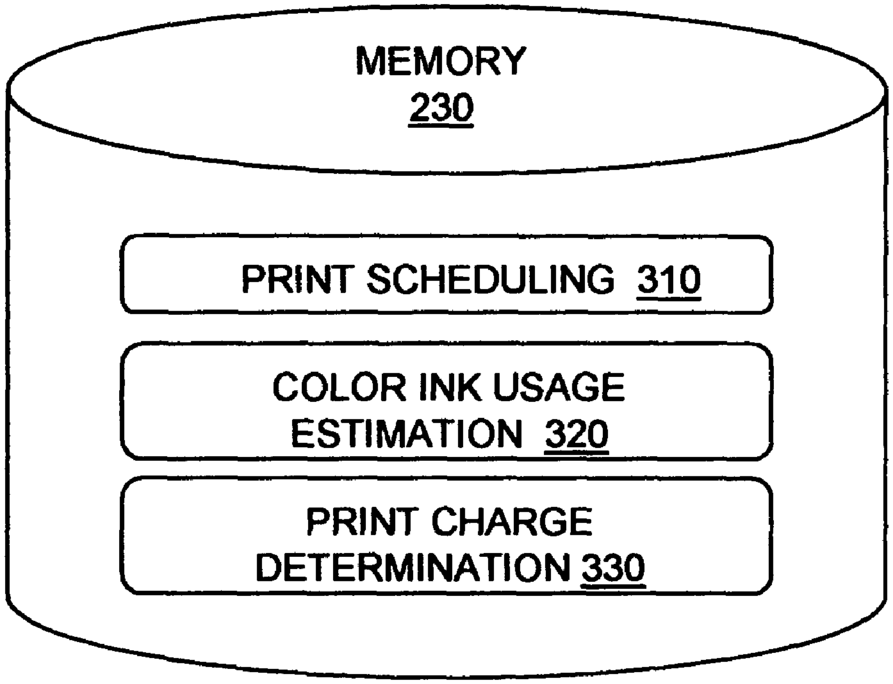
FIG. 3 shows the memory of FIG. 2 in more detail.

In FIGS. 2 and 3, print management node 120 is shown in more detail to include a network interface 210 communicatively coupled with a processor (CPU) 220 and a memory 230. Memory 230 includes one or more random access memories (RAM) and one or more read only memories (ROM). An operating system installed in memory 230 manages operations on print management node 120 by creating, scheduling and performing various tasks executed by processor 220. Such tasks include print scheduling 310, color ink usage estimation 320 and print charge determination 330. Print scheduling 310 includes assigning color print jobs associated with inbound print requests to ones of printing nodes 130 and queuing and scheduling print jobs for distribution to printing nodes 130. Color ink usage estimation 320 includes estimating the amount of color ink that will be consumed by print job elements through classification and analysis of individual color drawing objects of the print job elements in a pre-RIP format. Print charge determination 330 includes determining a print charge for print job elements, and ultimately for print jobs as a whole, by reference to color ink usage estimates.

Figure 4:
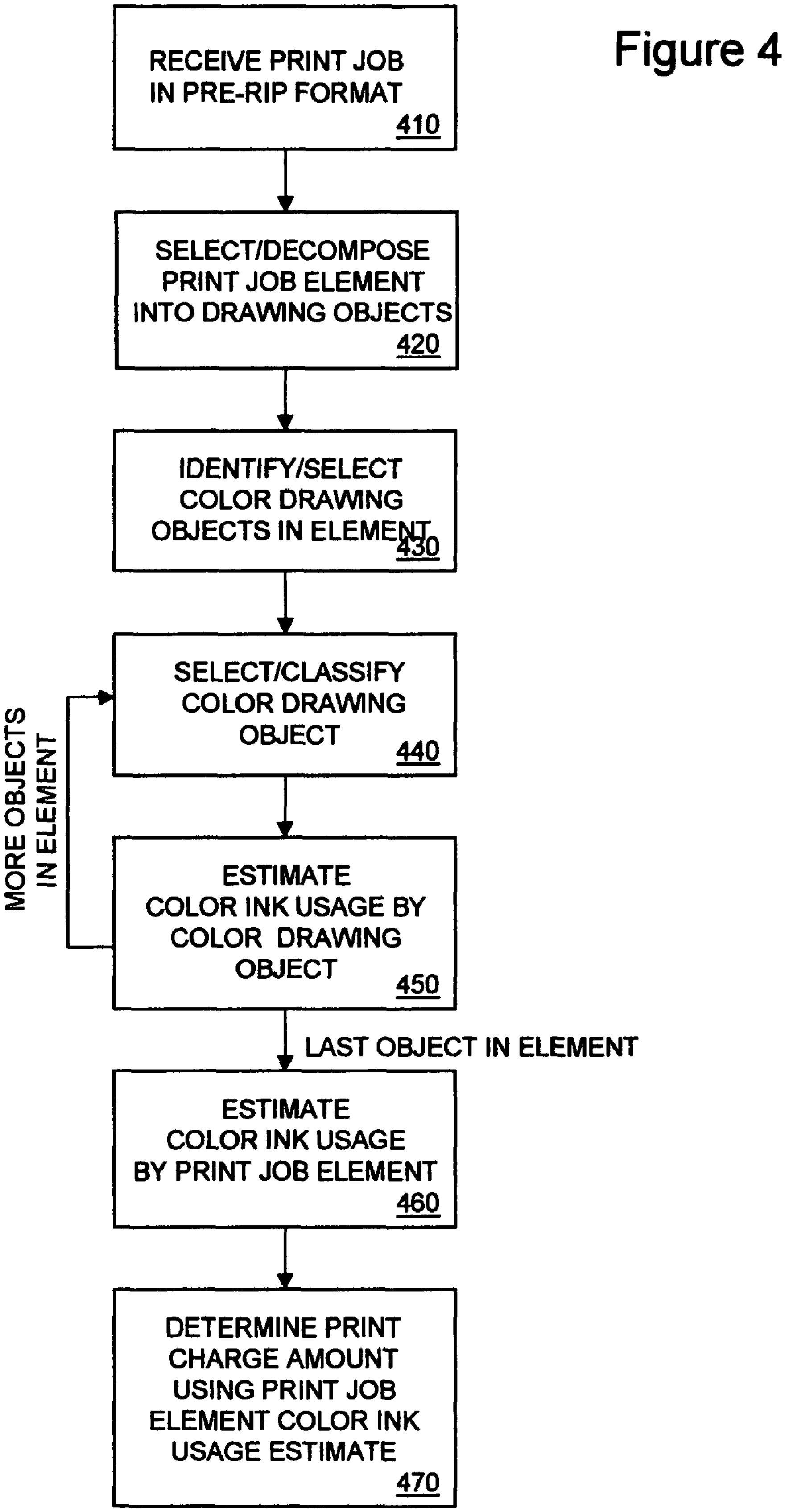
FIG. 4 shows a method for estimating color ink usage by a print job element and determining a print charge based thereon in some embodiments of the invention.

Turning now to FIG. 4, a method for estimating color ink usage by a print job element and determining a print charge based thereon in some embodiments of the invention is shown. Print management node 120 receives a print request for a color print job formatted in a pre-RIP format (410). In some embodiments, the pre-RIP format is a PDL format, such as a PCL5c, PCLXL, PostScript or PDF format. In other embodiments, the pre-RIP format may be a device independent bitmap format, such as a TIFF, JPEG, PNG, GIF, BMP or EXIF format. In still other embodiments, the pre-RIP format may be a document's original format, such as a MS Word format. In any event, upon receipt of the print request, print management node 120 performs a series of operations that yields an estimate of the amount of color ink that will be consumed in printing each element of the print job and, ultimately, determines a charge amount for printing the print job based at least in part on the color ink usage estimates. Naturally, color ink usage estimates may be one of several considerations used to determine a print charge for the print job; other considerations may include, for example, black ink usage estimates, paper type and amortization costs of the printing device. In some embodiments, a color ink usage estimate is generated individually for each element of a print job, after which a print charge is determined individually for each element of the print job, after which the print charges for each element of the print job are aggregated to determine a print charge for the entire print job. A print job element may be a logical page, an impression or a sheet, for example. A logical page is a page within an original document, such as a MS Word document. An impression is the printed content on one side of a sheet, and may include one or more logical pages. A sheet is the printed content on both sides of a sheet.

The series of operations begins with print management node 120 selecting a print job element and decomposing the print job element into individual drawing objects (420). In some embodiments, the individual drawing objects include text objects, vector objects and bitmap objects. Generally speaking, text objects are defined in terms of constituent characters, vector objects are defined in terms of constituent paths and bitmap objects are defined in terms of constituent pixels.

Next, print management node 120 identifies color drawing objects within the print job element (430). Print management node 120 separates color drawing objects from black-and-white drawing objects and, in some embodiments, filters block-and-white drawing objects. The black-and-white drawing objects will not consume color ink and therefore do not require individual analysis to estimate the amount of color ink that they will consume. However, in other embodiments it may be desirable to consider both color and black ink usage when levying printing charges. In these embodiments, instead of filtering black-and-white drawing objects, black-and-white drawing objects are analyzed separately from color drawing objects to estimate black ink usage.

Next, print management node 120 selects a color drawing object and assigns the color drawing object to a drawing object class (440). In some embodiments, the drawing object classes include a text object class, a vector object class and at least one bitmap object class. Print management node 120 maintains and applies a different predetermined set of color ink usage estimating rules for each drawing object class.

Next, print management node 120 applies the set of rules for the class of objects into which the color drawing object has been assigned to estimate the color ink that will be used in printing the object (450). The color ink usage estimate is a measure of color intensity multiplied by print area. In some embodiments, a separate color ink estimate is generated for each primary color, that is, individual estimates are generated for red, green and blue. In the estimating process, color drawing objects that are in the CMYK color space are converted into objects in the red, green, blue (RGB) color space before application of the rules, although in other embodiments color drawing objects that are in the RGB color space may be converted into objects in the CMYK color space for generating estimates. Once the color ink usage estimate for the drawing object has been obtained, the flow returns to Step 440 if there are more color drawing objects in the print job element to be analyzed and proceeds to Step 460 if all color drawing objects in the print job element have been analyzed.

Once all color drawing objects in the print job element have been analyzed, print management node 120 sums the color ink usage estimates for the individual color drawing objects to estimate the color ink usage for the print job element (460).

Finally, print management node 120 determines a print charge for the print job element using the print job element color ink usage estimate (470). Various charging methods may be employed. In some embodiments, the color ink usage estimates generated for each primary color are compared individually or collectively against one or more predetermined thresholds, with estimates exceeding thresholds being associated with predetermined higher print charges and estimates below thresholds being associated with predetermined lower print charges. In other embodiments, the color ink usage estimates generated for each primary color are multiplied individually or collectively by one or more predetermined cost factors to determine a print charge. In the case where the color ink usage estimates for each primary color are compared against a threshold or multiplied by a cost factor individually to determine print charges for each primary color, the print charges may be aggregated to arrive at a print charge for the print job element as a whole.

Where a print job has multiple print job elements, the operations described in FIG. 4 are repeated for each print job element and the print charges determined for the individual print job elements may be summed to arrive at a print charge for the print job as a whole. The charge amount for the print job may then be transmitted to the initiating one of client nodes 110 for authorization and/or accounting node 140 for verification or debiting, as appropriate.

Figure 5:
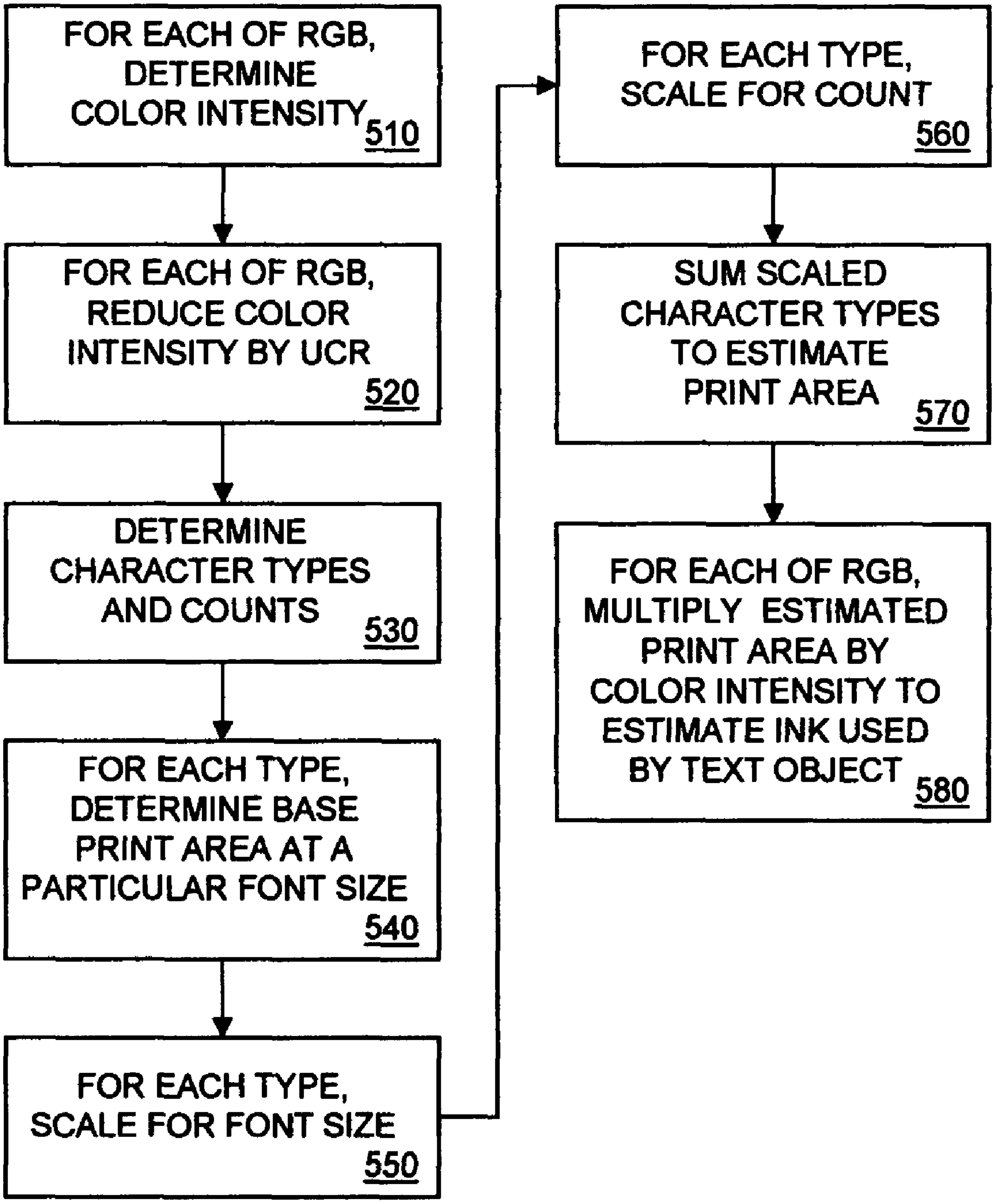
FIG. 5 shows a method for estimating color ink usage by a text drawing object in some embodiments of the invention.

FIG. 5 shows a method for estimating color ink usage by a text drawing object in some embodiments of the invention. First, print management node 120 determines color intensity for each of the red, green and blue components of the text object (510). In some embodiments, color intensity is measured on a scale, such as between zero and 255 in an 8-bit color plane, which is inverted if necessary such that a value of 255 reflects the highest intensity and a value of zero reflects the lowest intensity.

Next, print management node 120 reduces each of the red, green and blue color intensities by an estimated amount of under color removal (UCR) (520). The estimated amount of under color removal is the amount of ink of each color that is estimated to be replaced by block ink when the text object is printed and may be estimated based on, for example, object type or object characteristics.

Next, print management node 120 determines the character types and counts for the text object (530). Each letter, number and symbol in the text object of a particular font size is considered to be a unique character type. For each character type, a count indicates the frequency of occurrence of the character type.

Next, print management node 120, for each character type, determines a base print area for the character type (540). Each letter, number and symbol is associated with a predetermined base area that is defined in an area-related unit of measure, such as pixels, that the letter, number or symbol covers when at a particular font size, such as 10 point. Letters, numbers and symbols and their corresponding base areas are stored in a table in memory 230 that is referenceable to determine the base print area for each character type within the text object.

Next, print management node 120, for each character type, scales the base print area to adjust for font size (550). Each font size is associated with a predetermined size scaling factor that adjusts the base print area for a letter, number or symbol upward or downward, as necessary, to a size-adjusted print area. Font sizes and corresponding size scaling factors are stored in a table in memory 230 that is referenceable to determine a size-adjusted print area.

Next, print management node 120, for each character type, scales the size-adjusted print area by the count to produce a size- and count-adjusted print area (560). For example, if there are two instances of a character type in the text object, the size-adjusted print area is doubled to obtain a size- and count-adjusted print area.

Next, print management node 120 sums the size- and count-adjusted print areas for all character types to produce an estimated print area for the text object (570), after which the print area is multiplied individually by the color intensities of the red, green and blue color components to generate color ink usage estimates for each primary color with regard to printing of the text object (580).

Figure 6:
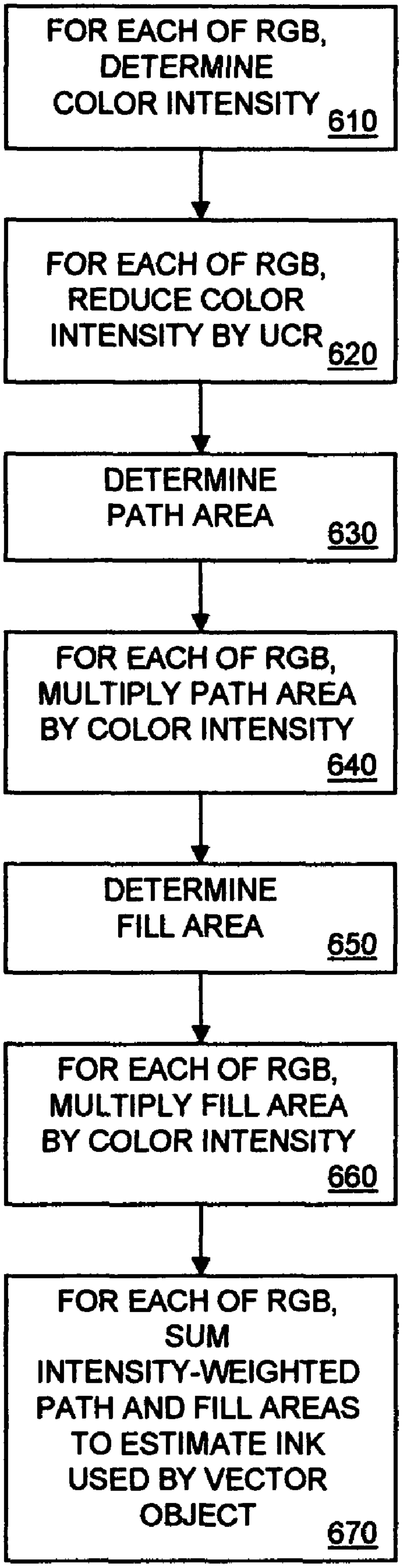
FIG. 6 shows a method for estimating color ink usage by a vector drawing object in some embodiments of the invention.

FIG. 6 shows a method for estimating color ink usage by a vector drawing object in some embodiments of the invention. First, print management node 120 determines the color intensities for each of the red, green and blue components of the vector object (610). In some embodiments, color intensity is measured on a scale, such as between zero and 255 in an 8-bit color plane, which is inverted if necessary such that a value of 255 reflects the highest intensity and a value of zero reflects the lowest intensity. Next, print management node 120 reduces each of the red, green and blue color intensities by an estimated amount of under color removal (620).

Next, print management node 120 determines the path area of the vector object (630). The path area is determined from the length and width of the path traversed by the vector.

Next, print management node 120 multiplies the path area by the individual color intensities of the red, green and blue color components to generate color ink usage estimates for each primary color with regard to the path area (640).

Next, print management node 120 determines the fill area, if any (650). The fill area is the area swept by the vector if the vector is filled.

Next, print management node 120 multiplies the fill area by the individual color intensities of the red, green and blue color components to generate color ink usage estimates for each primary color with regard to the fill area (660).

Finally, print management node 120 sums the intensity-weighted path and fill areas to generate color ink usage estimates for each primary color with regard to printing of the vector object (670).

Figure 7:
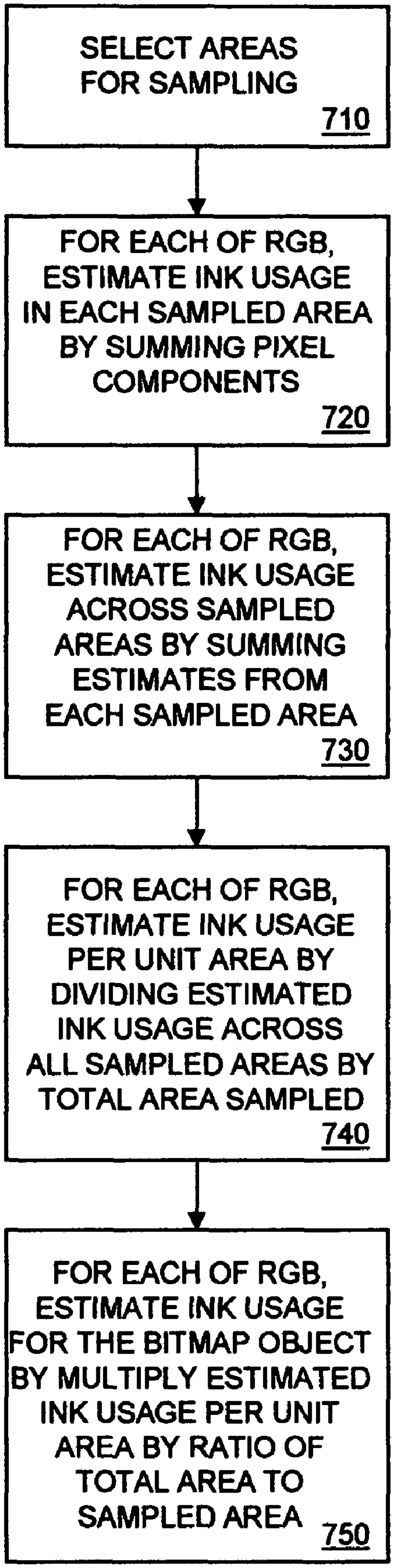
FIG. 7 shows a method for estimating color ink usage by a bitmap drawing object in some embodiments of the invention.

FIG. 7 shows a method for estimating color ink usage by a bitmap drawing object in some embodiments of the invention. The method relies on pixel sampling and interpolation, although details of the method depend on the manner in which the bitmap object is encoded.

Initially, regions of the bitmap object are selected for pixel sampling (710). The selected regions together consist of a subset of the entire bitmap. If the bitmap object is uncompressed, the pixel data is generally formatted in one or more contiguous stripes, and regions from the contiguous stripes are selected randomly for sampling. If the bitmap object is compressed, the compression method is examined to determine the best way of sampling. For lossless encoding, such as Huffman or arithmetic encoding, a count of the number of same consecutive bit patterns is generally kept in run-length sequences. In that event, a random set of run-length sequences may be selected for sampling. For “lossy” encoding, such as encoding by downsampling, the object is generally broken into tiles (e.g. pixel content boxes) that are downsampled and encoded. In that event, a random set of the downsampled tiles may be selected for sampling.

Next, ink usage for each of red, green and blue within each sampled region is estimated by pixel analysis (720). For each sampled region, the value of each color component of each pixel is reviewed and summed with values of like-color components of other pixels to estimate the amount of ink usage by the color.

Next, ink usage for each of red, green and blue across all sampled regions is estimated by summing the estimates obtained for each sampled region (730).

Next, ink usage for each of red, green and blue per unit area is estimated by dividing the estimates obtained across all sampled regions by the sampled area (740). Area may be defined in terms of a pixel count, for example.

Finally, an interpolation is performed that assumes that the sampled regions of the bitmap object are representative of the bitmap object in terms of color ink usage. In the interpolation, ink usage for the bitmap object for each of red, green and blue is estimated by multiplying the per unit area estimates by the ratio of the total area of the bitmap object to the sampled area of the bitmap object (750).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A computer node, comprising:

a network interface;

a memory; and a processor communicatively coupled with the network interface and the memory, wherein a print job element in a pre-raster image process (pre-RIP) format is received on the network interface and stored in the memory and wherein the processor has instructions executable thereon to, for each of a plurality of pre-RIP color drawing objects within the print job element, assign the object to a drawing object class selected from a plurality of predetermined drawing object classes including a text class, a vector class and a bitmap class and apply to the object a predetermined set of print area estimation rules dedicated to the class to which the object is assigned to obtain at least one color ink usage estimate for the object.

2. The computer node of claim 1, wherein the processor has instructions executable thereon to combine the color ink usage estimates obtained for each of the plurality of color drawing objects to obtain a color ink usage estimate for the print job element.

3. The computer node of claim 2, wherein the processor has instructions executable thereon to determine a charge based at least in part on the color ink usage estimate for the print job element.

4. The computer node of claim 3, wherein the computer node transmits information indicative of the charge to a client node for authorization.

5. The computer node of claim 3, wherein the computer node transmits information indicative of the charge to an accounting node for verification of sufficient funds.

6. The computer node of claim 3, wherein the computer node transmits information indicative of the charge to an accounting node for debiting an account.

7. The computer node of claim 1, wherein the computer node is a print management node that is communicatively coupled via a communication network with a client node and a printing node.

8. The computer node of claim 1, wherein the print job element is a logical page, an impression or a sheet.

9. The computer node of claim 1, wherein the pre-RIP format is a client application format, a page description language (PDL) format, a vector language format or a device independent bitmap format.

10. The computer node of claim 1, wherein the at least one color ink usage estimate for the object comprises an individual ink usage estimate for a primary color.

11. The computer node of claim 1, wherein the predetermined rules are operative to estimate color intensity and a print area for the object.

12. The computer node of claim 1, wherein the object is assigned to a text object class and the predetermined rules are operative to estimate a print area for each of a plurality of characters in the object based at least in part on character type.

13. The computer node of claim 1, wherein the object is assigned to a vector object class and the predetermined rules are operative to estimate a print area for the object based at least in part on a length and width of a path traversed by the object.

14. The computer node of claim 1, wherein the object is assigned to a vector object class and the predetermined rules are operative to estimate a print area for the object based at least in part on an area filled by the object.

15. The computer node of claim 1, wherein the object is assigned to a bitmap object class and the predetermined rules are operative to estimate a print area for the object based on color components of pixels in sampled areas of the object and interpolation.

16. A method for estimating color ink usage for a print job element, comprising the steps of:

receiving on a computer node the print job element in a pre-RIP format;

and, for each of a plurality of pre-RIP color drawing objects within the print job element:

assigning by the computer node the object to a drawing object class selected from a plurality of predetermined drawing object classes including a text class, a vector class and a bitmap class; and applying by the computer node to the object a predetermined set of print area estimation rules dedicated to the class to which the object is assigned to obtain at least one color ink usage estimate for the object.

17. The method of claim 16, further comprising the step of combining by the computer node the color ink usage estimates obtained for each of the plurality of color drawing objects to obtain a color ink usage estimate for the print job element.

18. The method of claim 17, further comprising the step of determining by the computer node a charge based at least in part on the color ink usage estimate for the print job element.

19. The method of claim 16, wherein the predetermined rules are operative to estimate color intensity and a print area for the object.

* * * * *